Nov. 3, 1964 H. W. ROORDA ETAL 3,155,082
CLIMATIC CONTROL APPARATUS FOR AN AIR COOLED ENGINE
Filed Aug. 13, 1962 5 Sheets-Sheet 1
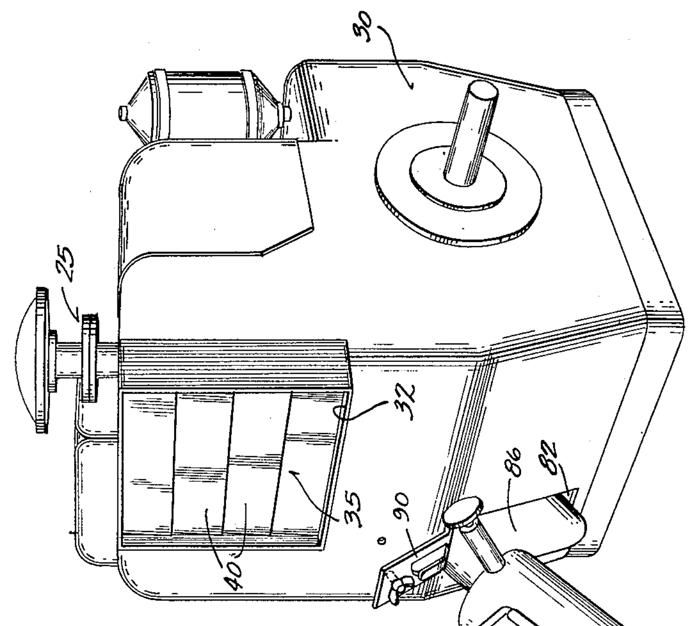
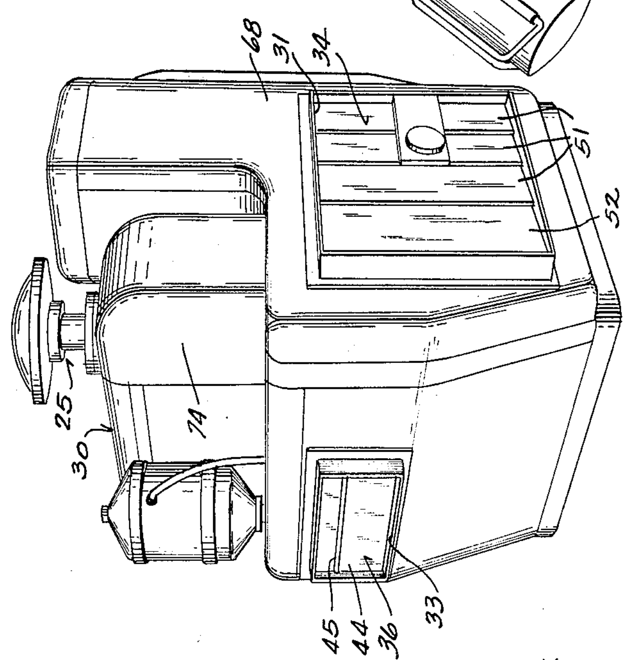
INVENTORS
HARRY W. ROORDA
JOHN A. GRESCH
RAY D. BEARD
BY Wheeler, Wheeler & Wheeler
ATTORNEYS CLIMATIC CONTROL APPARATUS FOR AN AIR COOLED ENGINE
Filed Aug. 13, 1962 5 Sheets-Sheet 2
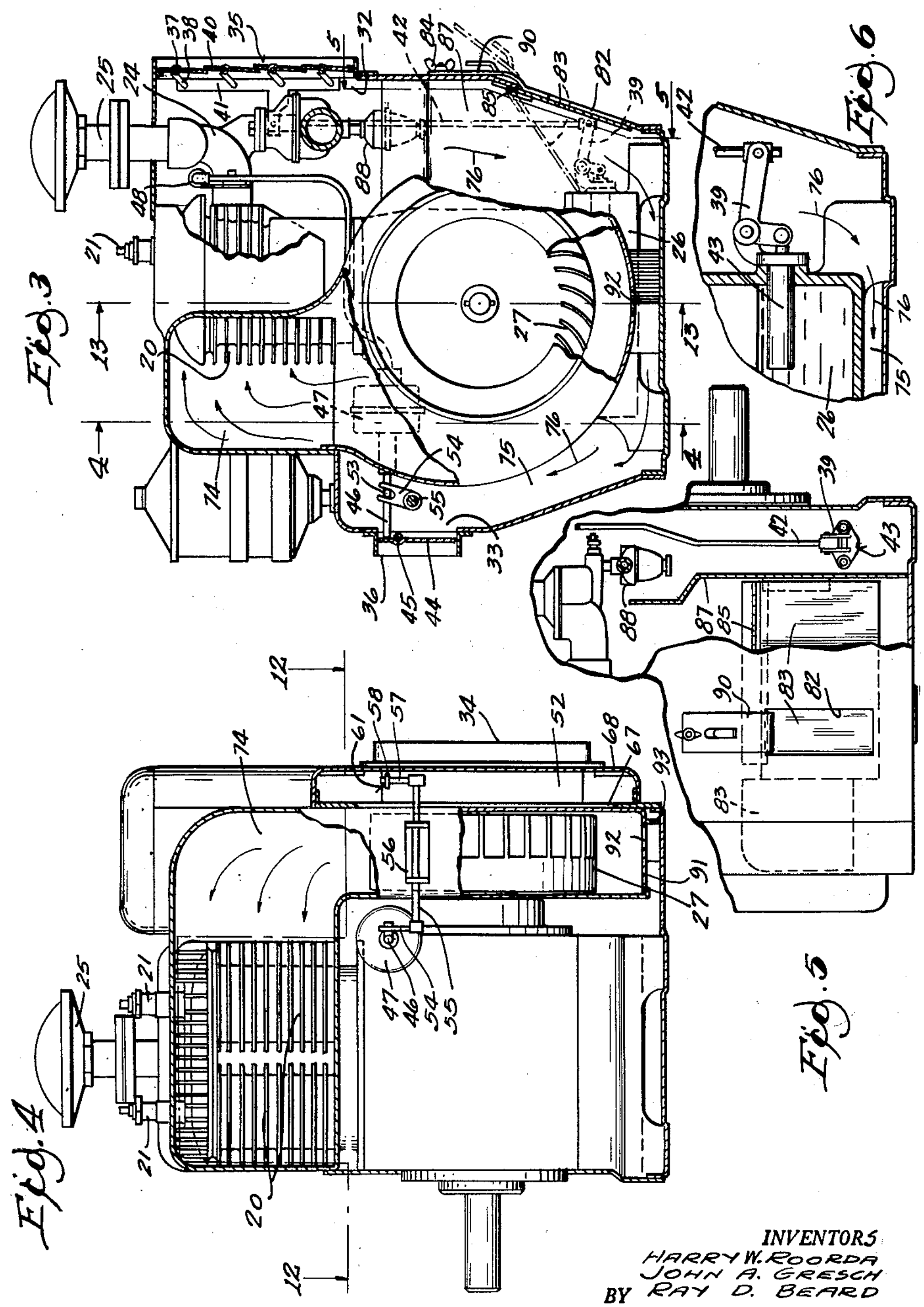
INVENTORS
HARRY W. ROORDA
JOHN A. GRESCH
BY RAY D. BEARD
Wheeler, Wheeler & Wheeler
ATTORNEYS CLIMATIC CONTROL APPARATUS FOR AN AIR COOLED ENGINE
Filed Aug. 13, 1962 5 Sheets-Sheet 3
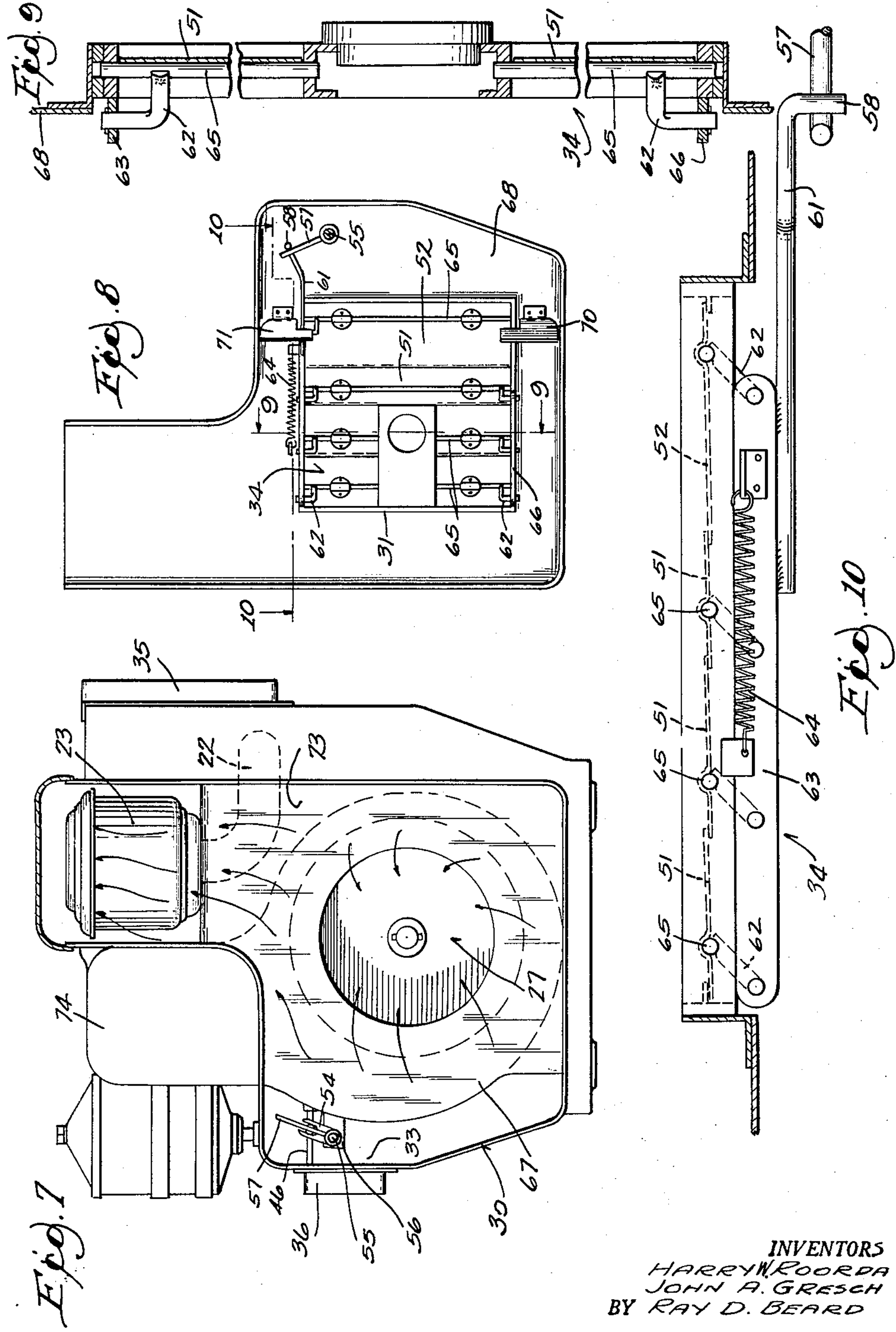
INVENTORS
HARRY W. ROORDA
JOHN A. GRESCH
BY RAY D. BEARD
Wheeler, Wheeler & Wheeler
ATTORNEYS CLIMATIC CONTROL APPARATUS FOR AN AIR COOLED ENGINE
Filed Aug. 13, 1962
5 Sheets-Sheet 4
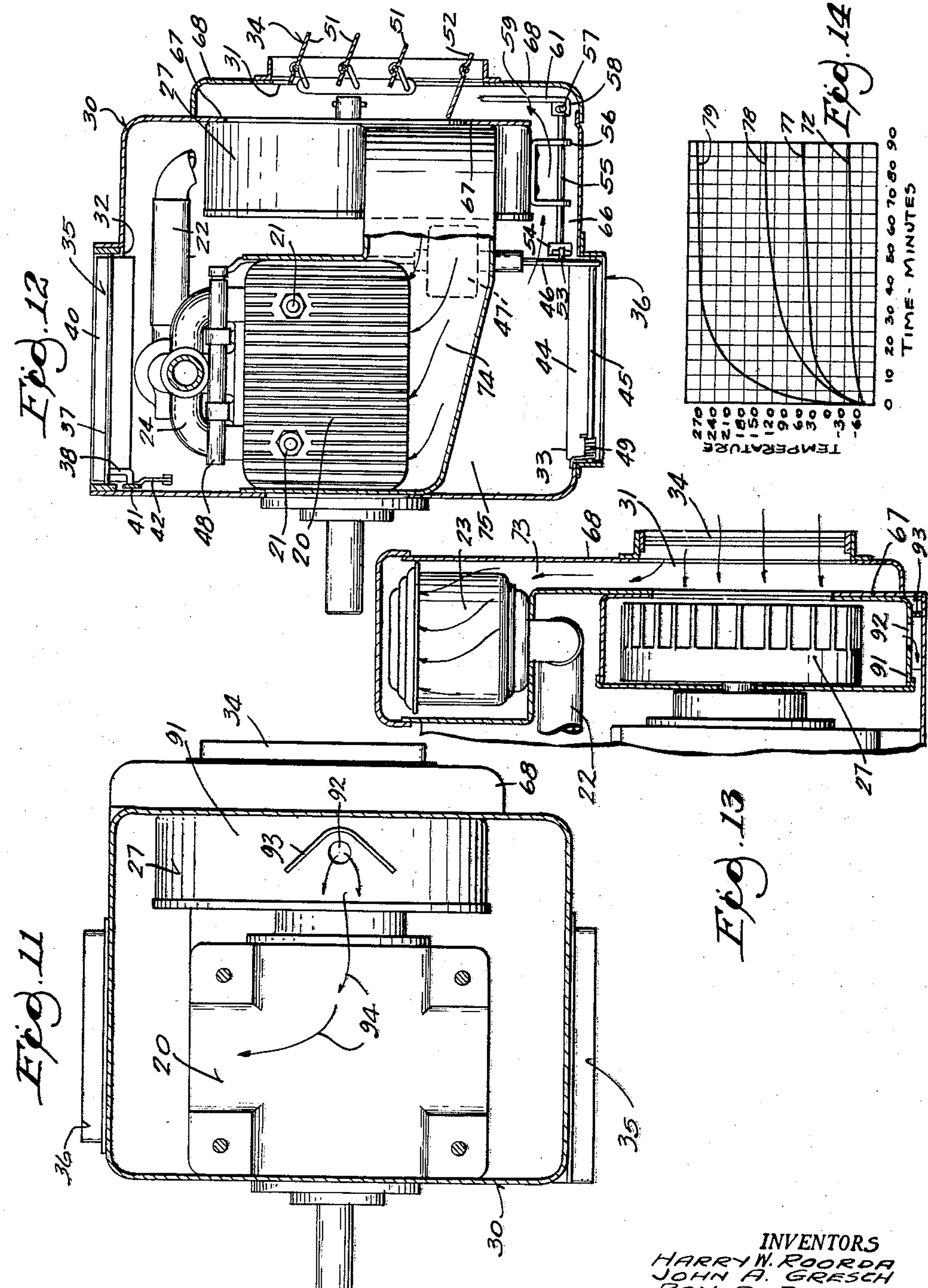
INVENTORS
HARRY W. ROORDA
JOHN A. GRESCH
RAY D. BEARD
BY
Wheeler, Wheeler & Wheeler
ATTORNEYS CLIMATIC CONTROL APPARATUS FOR AN AIR COOLED ENGINE
Filed Aug. 13, 1962 5 Sheets-Sheet 5
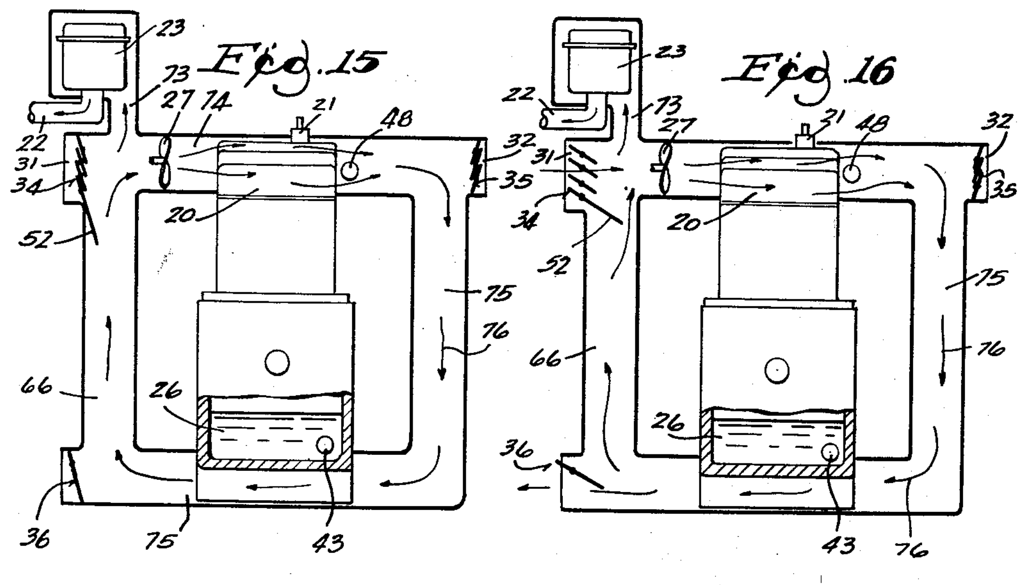
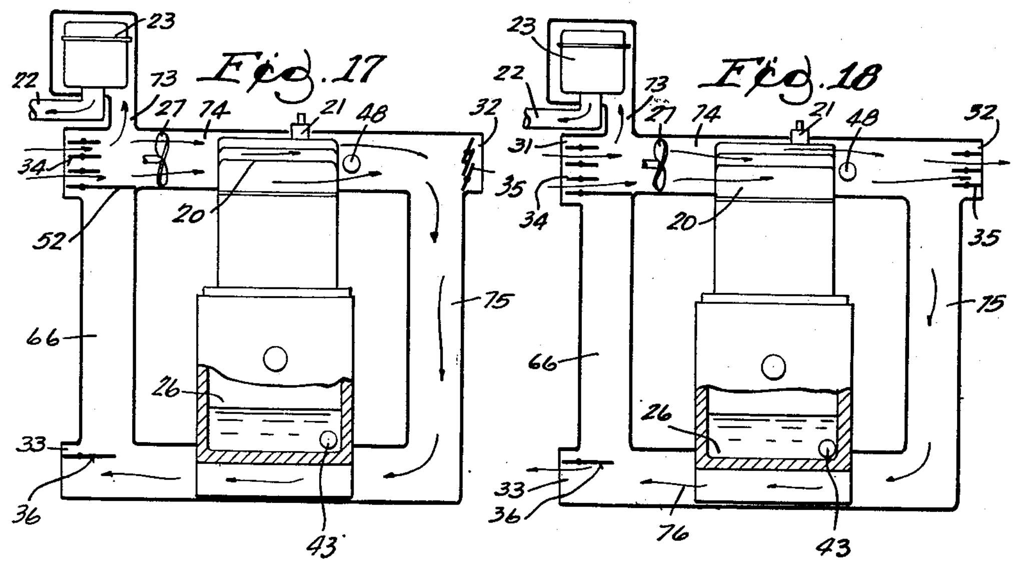
INVENTORS
HARRY W. ROORDA
JOHN A. GRESCH
BY RAY D. BEARD
Wheeler, Wheeler & Wheeler
ATTORNEYS 3,155,082
Patented Nov. 3, 1964

3,155,082

CLIMATIC CONTROL APPARATUS FOR AN AIR COOLED ENGINE

Harry W. Roorda and John A. Gresch, Waukesha, and Ray D. Beard, West Allis, Wis., assignors to Wisconsin Motor Corporation, Milwaukee, Wis., a corporation of Wisconsin Filed Aug. 13, 1962, Ser. No. 216,522
6 Claims. (Cl. 123—41.05)

This invention relates to climatic control apparatus for an air cooled engine.

The problems of starting and maintaining engine operations are particularly acute under arctic conditions. Ice crystals tend to form in air drawn into the inductive air intake. Lubricating oil collected in the sump or reservoir congeals and will not flow until heated. The spark plugs are below their operating temperature range and will not operate properly until heated.

According to the present invention, conventional air cooled engines are modified for satisfactory starting and operation throughout an ambient temperature range of −65° F. to +125° F. When the engine is started under arctic conditions as low as −65° F., the heat generated by engine operation is initially recirculated within an engine shroud and is used to bring certain component parts of the engine up to operating temperature.

The engine will be initially heated from an external source, as by a blow torch or the like, until the oil is rendered sufficiently fluid to flow enough to prevent damage to the engine. The engine is then started. Air within the engine shroud is recirculated over the engine cylinder to pick up heat generated therein and this recirculated air substitutes for the most part for fresh air which is ordinarily drawn by the air cooling blower from the atmosphere. This heated air is supplied to the inductive air intake, is passed over the oil reservoir, and also flows past the spark plugs.

According to the present invention, mechanism is provided to control the path of air flow to the various parts of the engine which need heat during the warm-up period. There are controls for the inductive air, for the air which flows over the engine cylinder and spark plugs, and the air which flows over the oil reservoir.

In the disclosed embodiment of the invention, there are intake and exhaust ports through the shroud. These are provided with shutters. There is also a passage between a fresh air intake port and an exhaust port having a mixing vane or shutter therebetween to control bypassing of air therebetween. The control mechanism aforesaid controls a sequence of opening and closing the shutters aforesaid and are interlocked in a cycle, which, in the initial starting stage at low atmospheric temperature, will direct recirculated air to the inductive air intake, the engine cylinder and spark plugs and the oil reservoir until this air reaches the minimum operating temperature range for the spark plugs. At this point, a thermostat responsive to the temperature of air flowing over the engine cylinders will partially open the fresh air intake shutter and the vane aforesaid to mix fresh air with recirculated air and supply this mixture to the air intake manifold and to the engine cylinders to prevent overheat of the engine. Recirculated air will continue to flow past the oil reservoir and transfer heat thereto.

When the spark plugs first reach full operating temperature (at this point the oil will normally still be too cold to flow freely), the mixing vane aforesaid will be completely closed to preclude any mixture of recirculating and fresh air so that the engine cylinders receive a full quota of cooling air. However, recirculated air is still passed over the oil reservoir and continues to transfer heat thereto.

When the oil temperature reaches optimum level, a thermostat will respond to open another exhaust port between the engine cylinder and the oil reservoir to discharge heated air before it reaches the oil reservoir and thus prevent overheating thereof.

The foregoing sequence applies to starting the engine under arctic conditions. Without any change whatsoever, the apparatus will operate in the tropics. The thermostats respond to ambient conditions so that when started in the tropics, the intake and exhaust port shutters will be open and the mixing vane will be closed and the engine will operate substantially as though it had no shroud. When open, the shutters aforesaid do not materially interfere with air flow through the various ports.

Provision is also made to baffle the flame from the starting blow torch to prevent damage to the engine or its electrical and other components.

Other objects, advantages and features of the invention will appear from the following disclosure, in which:

FIG. 1 is a front perspective view of an engine having a shroud and shuttered ports embodying the invention.

FIG. 2 is a rear perspective view of the engine of FIG. 1.

FIG. 3 is a view partly in front elevation and partly in section through the engine of FIG. 1.

FIG. 4 is a cross section taken substantially along the line 4—4 of FIG. 3.

FIG. 5 is a fragmentary view partly in elevation looking from the right side of FIG. 3 and partly in cross section taken substantially along the line 5—5 of FIG. 3.

FIG. 6 is an enlarged fragmentary detail view of a part of the apparatus shown in FIG. 3.

FIG. 7 is a front elevation with the front panel of the shroud removed, as shown in FIG. 8.

FIG. 8 is an inside view of the front panel of the shroud, as removed from the showing of FIG. 7, to expose details of the inlet shutter mechanism.

FIG. 9 is an enlarged cross section taken along the line 9—9 of FIG. 8.

FIG. 10 is an enlarged cross section taken along the line 10—10 of FIG. 8.

FIG. 11 is a bottom view of the engine with the bottom shroud panel removed.

FIG. 12 is a horizontal cross section taken substantially along the line 12—12 of FIG. 4.

FIG. 13 is a fragmentary cross section taken substantially along the line 13—13 of FIG. 3.

FIG. 14 is a graph plotting operating characteristics of a test device embodying the invention.

FIG. 15 is a flow diagram indicating the path of the air when starting under arctic conditions with intake and exhaust port shutters closed and the mixing vane open.

FIG. 16 is a similar flow diagram indicating air flow after the engine has partly warmed up with the shutters for the inlet port, recirculation port, and mixing vane approximately half open, but with the exhaust port closed.

FIG. 17 is a similar flow diagram indicating air flow after the engine is warmed up, except for the oil reservoir. The shutters for the intake port and the recirculating port are fully open, the mixing vane is closed, and the shutter for the exhaust port is closed.

FIG. 18 is a similar flow diagram indicating air flow after the engine is completely warmed up, all shutters are open, and the mixing vane is closed.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The climatic control apparatus of the present invention may be applied to a conventional air cooled internal combustion engine typically having engine cylinders 20, spark plugs 21, an intake air manifold 22 which introduces air into the carburetor through the air cleaner 23, an exhaust manifold 24, muffler 25, an oil reservoir 26, and an air cooling blower or fan 27. The engine aforesaid is housed in accordance with the present invention within a shroud indicated generally by reference character 30 which completely surrounds the engine, but which has a shuttered air inlet port 31 aligned with the eye of the blower 27, a shuttered air exhaust port 32 and a shuttered recirculating air outlet port 33. The respective shuttered ports 31, 32, 33 are provided with shutters 34, 35, 36, which, for the most part, are conventional per se, except in the case of the shutter 34 for inlet port 31, which incorporates mixing vane 52 therein.

As best shown in FIG. 3, shutter 35 for exhaust port 32 consists of a series of louvers 40 pivoted on axle shafts 37, each axle shaft having a crank 38 connecting it to a tie rod 41 by which the respective cranks 38 and louvers 40 are articulated when the tie rod is moved under the thrust of rod 42 which is responsive to the fluid expansion type thermostat 43 in the oil reservoir 26. When cold, the thermostat is effective through bell crank 39 to close shutter 35. When the oil in reservoir 26 rises to operating temperature, shutter 35 will open.

As best shown in FIGS. 3 and 12, shutter 36 for recirculating air outlet port 33 is provided with a single louver 44 mounted on an axle shaft 45 subject to the closing bias of spring 49 and the opening thrust of rod 46 actuated by the fluid motor or bellows 47 responsive to the fluid expansion type thermostat 48 which is in the path of air flowing over the cylinder 20. When cold, the thermostat 48 retracts rod 46 and spring 49 closes the shutter 36. When warm, shutter 36 will open under the thrust of rod 46.

As best shown in FIGS. 3 and 8, fluid thermostat 48 also controls the relative degree of opening of the louvers 51, 52 of shutter 34 which is in front of the inlet port 31 through the shroud 30 to the eye of the centrifugal blower 27. Thrust rod 46 from bellows 47 carries a transverse pin 53 which engages bell crank yoke 54 mounted on the cross shaft 55 which is supported on bracket 56 from the engine frame.

The end of cross shaft 55 is connected to crank arm 57 which extends through a loop 58 formed on the end of the thrust rod 61 which is connected to the link 63, which is in turn pivotally connected to the several cranks 62 on the louvers 51, 52 of the shutter 34.

Link 63 is biased to the closed position of all of the louvers 51, 52 by spring 64. In the preferred construction, there are cranks 62 at both the top and bottom ends of the louvers 51, 52, each of the louvers being mounted on an axle shaft 65. A bottommost connecting link 66 is desirably provided for the cranks 62 at the lower ends of the axle shafts 65.

Louver 52 is considerably wider than louver 51. When shutter 34 is open, louver 52 is disposed as best shown in FIG. 12 to extend completely across the space between the shutter housing 68 and the scroll housing 67 of the blower 27, thus to block the passage 66 through which recirculated air otherwise returns to the eye of the blower 27 on the path of arrows 59. The disclosed construction eliminates any need for a separate vane in the return passage 66, although such is a practical alternative.

In order to completely close off the return passage 66 under the circumstances aforesaid, the front panel 68 of the shroud 30, the same being shown removed from the shroud in FIG. 8, is provided with fixed vane segments 70, 71 spot welded or otherwise fastened to the panel 68 and extending transversely across passage 66. When the vane 52 is in its closed position, as shown in FIG. 12, it cooperates with the vane segments 70, 71 to close the passage 66 and preclude mixing of recirculating air with fresh air entering through shutter 34.

The shroud 30 defines several air passages within the shroud and about engine components. FIGS. 15–18 diagrammatically show the air passages, the location of the induced air inlet 22, cylinder 20, spark plugs 21 and oil reservoir 26 with respect to the several passages and the functional location of the various exhaust ports and shutters with respect thereto and illustrate various conditions of air flow during the several stages of the warm-up of the engine from a dead cold start to the condition where all parts of the engine have reached operating temperature.

There is a first air passage 73 which communicates directly between the air cleaner 23 for the induced air intake manifold 22 and the fresh air intake opening 31, as best shown in FIGS. 7 and 13. The intake manifold 22 is under approximately thirty inches of water vacuum and will hence always draw air thereto, even away from the low pressure side of the blower 27 which is ordinarily at one or two inches of water vacuum.

There is a second passage 74, best shown in FIGS. 3, 4 and 12, through which air impelled by the blower 27 is directed against the engine cylinders 20 and those portions of the spark plugs 21 within the shroud 30. When the engine is fully warmed up with the oil reservoir at proper temperature, most of the air impelled through passage 74 is discharged through the open shutter 35 in main exhaust port 32. However, when the exhaust port shutter 35 is closed during the warm-up period, the air passing over the engine cylinders 20 flows on the path of arrows 76 through third passage 75, which extends downwardly as is best shown in FIGS. 3 and 6 past the oil reservoir 26 and continues on beneath the engine and toward the recirculating air exhaust port 33. Air flowing through third passage 75 has been heated by flowing over the cylinder 20 and will transfer heat to the cold oil reservoir 26 during the start-up period of the engine, as aforesaid. When recirculating air shutter 36 is opened, this air is vented through recirculating air exhaust port 33, as aforesaid.

As aforestated, there is a return air passage 66 interconnecting passage 75 with the intake eye of the blower 27, when vane 52 is open, as is shown in FIGS. 15 and 16. When the vane 52 is closed, as shown in FIGS. 12, 17 and 18, there is no flow of air through the return passage 66.

With specific reference to the diagrammatic FIGS. 15–18, FIG. 15 illustrates starting the engine when cold. Thermostat 48 responds to a cold engine cylinder and closes shutters 34, 36 and opens mixing vane 52. Thermostat 43 responds to the cold oil reservoir 26 to close exhaust port shutter 35. Accordingly, all of the air impelled by the fan 27 is recirculated around the continuous path of the interconnected air passages 74, 75, 66. The manifold 22 draws air from the low pressure side of the fan 27 and make-up air to supply air thus consumed leaks in through spaces in the shroud around the spark plugs, etc.

As the engine cylinder 20 begins to warm up and heat the air flowing thereover, thermostat 48 will respond as shown in FIG. 16 to partially open shutters 34 and 36 and partially close mixing vane 52. This means that some fresh air will be drawn into the blower through partially open shutter 34 to be mixed with recirculated air which can still flow through return passage 66 to the low pressure side of the blower 27. Excess air within the shroud is discharged or vented to the atmosphere through the partially open recirculating air port shutter 36. Because the oil reservoir 26 heats up at a much slower rate than the cylinder, thermostat 43 maintains the main exhaust port shutter 35 closed as shown in FIG. 16 so that air heated by flowing over the cylinder 20 continues to flow through air passage 75 and transfers heat to the oil reservoir 26.

When the cylinder 20 and the spark plugs 21 reach full operating temperature, the thermostat 48 responds to open completely the input shutter 34 and the recirculating air exhaust port shutter 36 and also closes completely the mixing vane 52. However, the oil reservoir 26 may still be cold and thermostat 43 maintains the main exhaust shutter 35 in its closed position. Accordingly, heated air is still circulated through the passage 75 and passed over the oil reservoir 26 to be discharged through the open shutter 36. However, cold outside air is drawn through the open shutter 34 to prevent overheating of the cylinder 20 and provide full cooling therefor. Air intake manifold 22 will be supplied only with fresh air, but will be warm enough to preclude formation of ice crystals therein.

After the oil reservoir 26 has risen to operating temperature, the shutter 35 will open, as shown diagrammatically in FIG. 18, thus to cut flow of air through passage 75 and preclude overheating of the reservoir 26, substantially all air being discharged directly through the open discharge port shutter 35.

From the foregoing sequence, it is clear that the various parts of the engine which need heating will be exposed to recirculated heated air until their operating temperatures are reached, whereupon the air flow pattern will be shifted accordingly.

When operating the unit in temperatures at or above normal (60° F. to 80° F.), all shutters will open instantly, if not already open. These shutters 34, 35, 36 are of the type which do not substantially impede air flow when they are open. Accordingly, the engine will be cooled efficiently at ambient temperatures as high as 125° F., even when the engine is equipped with apparatus embodying the present invention.

The foregoing sequence of operations is illustrated in graph form in FIG. 14 in which a test engine was operated at no load in a cold box at the temperatures and for the period indicated. The ambient temperature within the cold box is indicated by the graph line 72. The temperature of the air entering the carburetor is indicated by graph line 77, the temperature of the oil is indicated by graph line 78, and the spark plug temperature is indicated by graph line 79.

As aforestated, initial starting of the engine is preceded by application of external heat to the oil reservoir 26. For this purpose, the shroud 30 is provided with a blow torch spout port 82 shown in FIG. 2 and which is normally closed by a hinged door 83 having a handle 90. As shown in FIGS. 3 and 5, the door 83 is swingable on hinge 85 to the inner face of shroud 30 and which is held thereto by engagement of thumbscrew 84 with handle 90, as shown in FIG. 3, to close the opening 82 and to lie adjacent the downwardly sloping side of the shroud 30, thus not to block the passageway 75 or the flow of the air on the path of arrows 76. However, when the blow torch nozzle 86 is thrust into the opening 82, as shown in FIG. 2, it pushes the door 83 to its dotted line position shown in FIG. 3. The door 83 then functions as a baffle to require the flame and heat generated by the blow torch to pass beneath the engine and along the oil reservoir 26.

To protect the linkages 39, 42 interconnecting the oil reservoir thermostat 43 with the shutter 35, these are placed behind an upright baffle 87, the plane of which is transverse to the axis of hinge 85. The combination of the door baffle 83 and baffle 87 also shields electrical wiring, the fuel line 88, etc., from exposure to the intense heat of the blow torch. The torch is used long enough to fluidize the oil in reservoir 26 and permit cranking of the engine. The blow torch is withdrawn before cranking is commenced. Subsequent heating of the oil reservoir 26 results from the flow of recirculated air thereagainst through the passage 75.

The blower casing 91 is provided with an opening 92 into curved deflector 93 to channel some air flow directly from the high pressure zone within casing 91 across oil pan 20, as indicated by arrows 94. Accordingly, even after the engine has fully warmed up, as shown in FIG. 18, some cooling air is supplied to the oil pan through hole 92 and is discharged through air outlet port 33.

I claim:

1. Climatic control apparatus for an air cooled engine having an inductive air intake, an engine cylinder which heats up during the course of engine operation and an oil reservoir, said apparatus comprising a shroud about the engine defining air passages to said inductive air intake, said cylinder and said reservoir, a blower to circulate air through at least some of said passages, a fresh air intake into said shroud, an exhaust outlet from said shroud, shutters for selectively opening and closing said intake and outlet, thermostat means responsive to cylinder temperature, thermostat means responsive to oil temperature and shutter operators operatively connected to said thermostats for sequentially actuating said shutters in stages responsive to the temperature of the engine cylinder and the oil.

2. The device of claim 1 in which said shroud is further provided with a recirculating air outlet having a shutter, a passage between the fresh air intake and said recirculating air outlet, linkage means interconnecting the recirculating outlet shutter with the intake shutter and a mixing vane in the said passage, said recirculating outlet shutter, said inlet shutter and said vane being interconnected for concurrent movement thereof.

3. Climatic control apparatus for an air cooled engine having an inductive air intake, an engine cylinder and an oil reservoir, said apparatus comprising a shroud about the engine, a fresh air intake through the shroud, a blower behind the intake, an air passage from said fresh air intake to the inductive air intake, a passage from said blower to said cylinder, a passage from said cylinder to said oil reservoir, a return passage for returning recirculating air from the passage last mentioned to said blower, an exhaust port from the shroud to the atmosphere, shutter means in said fresh air intake, said exhaust port and said return passage and operating means responsive to engine cylinder temperature and oil reservoir temperature for selectively actuating said shutters to sequentially supply recirculated air, a mixture of recirculated air and fresh air, and fresh air only to the passage to the engine cylinder.

4. The apparatus of claim 3 in which said shroud is further provided with a recirculating air exhaust port venting said return passage to the atmosphere, a shutter in said recirculating air exhaust port, said operating means including means to open the shutter last mentioned whenever the shutter in the fresh air intake is open.

5. The apparatus of claim 3 in which the shutter means in the fresh air intake comprises multiple louvers, one of said louvers being disposed in said return passage when the said shutter means is open, thus to close the return air passage.

6. Climatic control apparatus for an air cooled engine having an inductive air intake, an engine cylinder, an oil reservoir and a blower to blow air over said cylinder, said apparatus comprising a shroud substantially completely enclosing said engine and blower, said shroud having a fresh air inlet port adjacent said blower, said shroud defining a first air passage from said fresh air inlet port to said inductive air intake, a second air passage from said blower to said cylinder, a third air passage from said cylinder past said oil reservoir and a fourth air passage from said third air passage back to said blower, a main exhaust port between said second and third passages, a recirculating air exhaust port between said third and fourth passages, shutters in each of said ports and a mixing vane in said fourth passage, and thermostat means responsive to the temperature of the air flowing over said engine cylinder and the oil reservoir to actuate said shutters and mixing vane in the following sequence when starting the engine at a temperature low enough to initially close all such shutters:

(*a*) thermostat means responsive to cold engine cylinder and cold oil reservoir to close all shutters and open the mixing vane to recirculate air through said passages and expose the inductive air intake and oil reservoir to air heated by flowing over the cylinder, (*b*) thermostat means responsive to warm engine cylinder and still cold oil reservoir to partially open shutter in fresh air intake port, partially open shutter in recirculating air exhaust port, partially close mixing vane in said fourth passage and maintain shutter in main exhaust port closed to mix recirculated air with fresh air at blower and continue to expose oil reservoir to heated air, (*c*) thermostat means responsive to hot engine cylinder and still cold oil reservoir to completely open shutter in fresh air intake port, completely open shutter in recirculating air exhaust port, completely close mixing vane in said fourth passage and maintain shutter in main exhaust port closed to admit fresh air only at blower and continue to expose oil reservoir to heated air, (*d*) thermostat means responsive to hot engine cylinder and warm oil reservoir to completely open all shutters and close mixing vane to discharge heated air through main exhaust port and cut flow of heated air to oil reservoir.

References Cited in the file of this patent

UNITED STATES PATENTS

| | | |
|---|---|---|
| 2,690,168 | Nallinger | Sept. 28, 1954 |
| 2,737,169 | Kimberlin | Mar. 6, 1956 |
| 2,827,026 | Mall et al. | Mar. 18, 1958 |
| 2,904,021 | Stump | Sept. 15, 1959 |